United States Patent
Gopalan

(10) Patent No.: US 7,721,370 B2
(45) Date of Patent: May 25, 2010

(54) ADJUSTABLE HOSE CLIP

(75) Inventor: Suresh Cherulassery Gopalan, Cary, NC (US)

(73) Assignee: Pentair Water Pool and Spa, Inc., Sanford, NC (US)

( * ) Notice: Subject to any disclaimer, the term of this patent is extended or adjusted under 35 U.S.C. 154(b) by 1010 days.

(21) Appl. No.: 11/455,348

(22) Filed: Jun. 19, 2006

(65) Prior Publication Data

US 2007/0289075 A1 Dec. 20, 2007

(51) Int. Cl.
E04H 4/16 (2006.01)

(52) U.S. Cl. .................. 15/1.7; 15/1; 15/246; 24/327; 24/499; 24/500; 24/501; 210/167.17; 210/232

(58) Field of Classification Search ............... 15/1, 15/1.7, 246; 24/327, 499, 500, 501; 210/167.17, 210/232

See application file for complete search history.

(56) References Cited

U.S. PATENT DOCUMENTS

| | | | | |
|---|---|---|---|---|
| 823,889 | A | * | 6/1906 | McChesney ............... 24/501 |
| 1,468,884 | A | * | 9/1923 | Schneider ................. 24/501 |
| 1,877,006 | A | * | 9/1932 | Merryman ................ 24/499 |
| 2,421,067 | A | | 5/1947 | Howe |
| 2,698,639 | A | | 1/1955 | Bottomley |
| 2,843,309 | A | | 7/1958 | Wheeler |
| 3,030,681 | A | * | 4/1962 | Phillips ............... 248/229.15 |
| 3,456,262 | A | * | 7/1969 | Coon ...................... 24/501 |
| 3,932,281 | A | | 1/1976 | Pansini |
| 3,972,339 | A | | 8/1976 | Henkin et al. |
| 4,040,864 | A | | 8/1977 | Steeves |
| 4,063,333 | A | * | 12/1977 | Schweitzer ............... 24/567 |
| 4,277,864 | A | * | 7/1981 | Orson, Sr. ................ 24/327 |
| 4,575,423 | A | | 3/1986 | Alanis et al. |
| 4,589,986 | A | | 5/1986 | Greskovics et al. |
| 4,618,420 | A | | 10/1986 | Alanis |
| 4,776,954 | A | | 10/1988 | Brooks |
| 4,778,599 | A | | 10/1988 | Brooks |
| 4,839,063 | A | | 6/1989 | Brooks |
| 4,880,531 | A | | 11/1989 | Blake et al. |
| 5,267,374 | A | * | 12/1993 | Drake .................... 24/30.5 R |
| 5,301,393 | A | * | 4/1994 | Brown .................... 24/67.7 |
| 5,336,403 | A | | 8/1994 | Marbach |
| 5,363,538 | A | * | 11/1994 | Arrendiell et al. ........... 24/499 |
| 5,417,495 | A | | 5/1995 | Branson |
| 5,536,397 | A | | 7/1996 | D'Offay |
| 5,855,046 | A | * | 1/1999 | Dymott et al. ............. 24/507 |
| 5,863,425 | A | | 1/1999 | Herlehy et al. |
| 5,919,359 | A | | 7/1999 | Bisseker |

(Continued)

Primary Examiner—Mark Spisich
(74) Attorney, Agent, or Firm—Greenberg Traurig, LLC

(57) ABSTRACT

An adjustable hose clip is provided for use with a pool cleaner debris bag, including a first member having a retaining arm and a second member having a retaining arm. The hose clip also includes means for connecting the hose clip to a pool cleaner debris bag and resilient means for resiliently biasing the retaining arms towards each other such that at least a portion of a pool hose can be retained between the retaining arms. In one example, the resilient means is adapted to automatically adjust the distance between the retaining arms to accommodate various pool hoses having various diameters within the range of a minimum diameter to a maximum diameter at least 50% larger than the minimum diameter. In addition or alternatively, an arrangement for cleaning a swimming pool can include an automatic pool cleaner, a debris bag, a hose and an adjustable hose clip.

5 Claims, 4 Drawing Sheets

U.S. PATENT DOCUMENTS

| | | | |
|---|---|---|---|
| 5,960,520 A * | 10/1999 | Conway et al. | ............... 24/306 |
| 6,027,641 A | 2/2000 | Spradbury et al. | |
| 6,071,322 A | 6/2000 | Hulthen | |
| 6,241,899 B1 | 6/2001 | Ramos | |
| 6,302,277 B1 | 10/2001 | Resh | |
| 6,706,175 B1 | 3/2004 | Rief et al. | |
| 6,740,233 B2 | 5/2004 | Stoltz et al. | |
| 6,786,947 B2 | 9/2004 | Mountford | |
| 2005/0029177 A1 | 2/2005 | Peterson, Jr. et al. | |
| 2005/0040094 A1 | 2/2005 | Meritt-Powell | |

* cited by examiner

ADJUSTABLE HOSE CLIP

FIELD OF THE INVENTION

The present invention relates generally to hose clips for use in swimming pools, and in particular to hose clip for use with an automatic swimming pool cleaner.

BACKGROUND OF THE INVENTION

Automatic swimming pool cleaners for cleaning the floor and sidewalls of a swimming pool are well known. There are many types of pool cleaners in the pool cleaning market, such as pressure or return side cleaners, suction cleaners, electric cleaners, and in-floor cleaners. The pool cleaners can be submerged and can move along the pool floor and sidewalls. Additionally, the pool cleaners must be able to withstand harsh chemicals often found in swimming pool water, such as chlorine, bromine, ozone, or the like.

Some pool cleaners, such as pressure or return side cleaners, can use a debris bag to collect debris in the pool. For example, water from a pump can be fed into the cleaner by a pressure hose to sweep and collect debris into the bag carried by the cleaner. It is known to tether the debris bag to a portion of the pool cleaner, such as the pressure hose, to provide support for the debris bag. For example, the tether can include a hook and loop type fastener adapted to wraparound the pressure hose. However, after repetitive use, especially in a harsh chemical environment, a hook and loop type fastener can degrade and begin to fail. Further, a hook and loop type fastener is susceptible to failure if it is clogged by debris. Accordingly, there is a continuing need for an improved hose clip.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with an aspect of the present invention, an adjustable hose clip is provided for use with a pool cleaner debris bag, including a first member having a retaining arm and a second member having a retaining arm. The retaining arms are adapted to be selectively spaced a distance from each other. The adjustable hose clip further includes means for connecting the hose clip to a pool cleaner debris bag and resilient means for resiliently biasing the retaining arms towards each other such that at least a portion of a pool hose can be retained between the retaining arms. The resilient means is adapted to automatically adjust the distance between the retaining arms to accommodate various pool hoses having various diameters within the range of a minimum diameter to a maximum diameter at least 50% larger than the minimum diameter.

In accordance with another aspect of the present invention, an adjustable hose clip is provided for use with a pool cleaner debris bag, including a first member including a handle, a lip and a retaining arm having an arcuate portion, and a second member including a handle, a lip and a retaining arm having an arcuate portion. The second member is pivotally attached to the first member such that the arcuate portions of the retaining arms are adapted to be selectively spaced a distance from each other when the handle of the first member is moved towards the handle of the second member. A connecting member is adapted to connect the hose clip to a pool cleaner debris bag. At least one of the handles of the first member and the second member is adapted to attach to the connecting member. A resilient member is adapted to resiliently bias the arcuate portions of the retaining arms towards each other such that at least a portion of a pool hose can be retained between the arcuate portions. The resilient member is retained by the lips of the first and second member.

In accordance with yet another aspect of the present invention, an arrangement for cleaning a swimming pool is provided, including an automatic pool cleaner adapted to collect debris from the pool, a debris bag having a first end and a second end, wherein the first end is adapted to attach to the automatic pool cleaner, and a hose adapted to provide pressurized water to the automatic pool cleaner. The arrangement also includes an adjustable hose clip comprising at least two retaining arms adapted to be selectively spaced a distance from each other, means for connecting the hose clip to the debris bag, and resilient means for resiliently biasing the retaining arms towards each other such that at least a portion of the hose can be retained between the retaining arms. The resilient means is adapted to automatically adjust the distance between the retaining arms to accommodate various hoses having various diameters within the range of a minimum diameter to a maximum diameter at least 50% larger than the minimum diameter. The means for connecting is further adapted to maintain the second end of the debris bag above the first end when the pool hose is being retained by the retaining arms.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
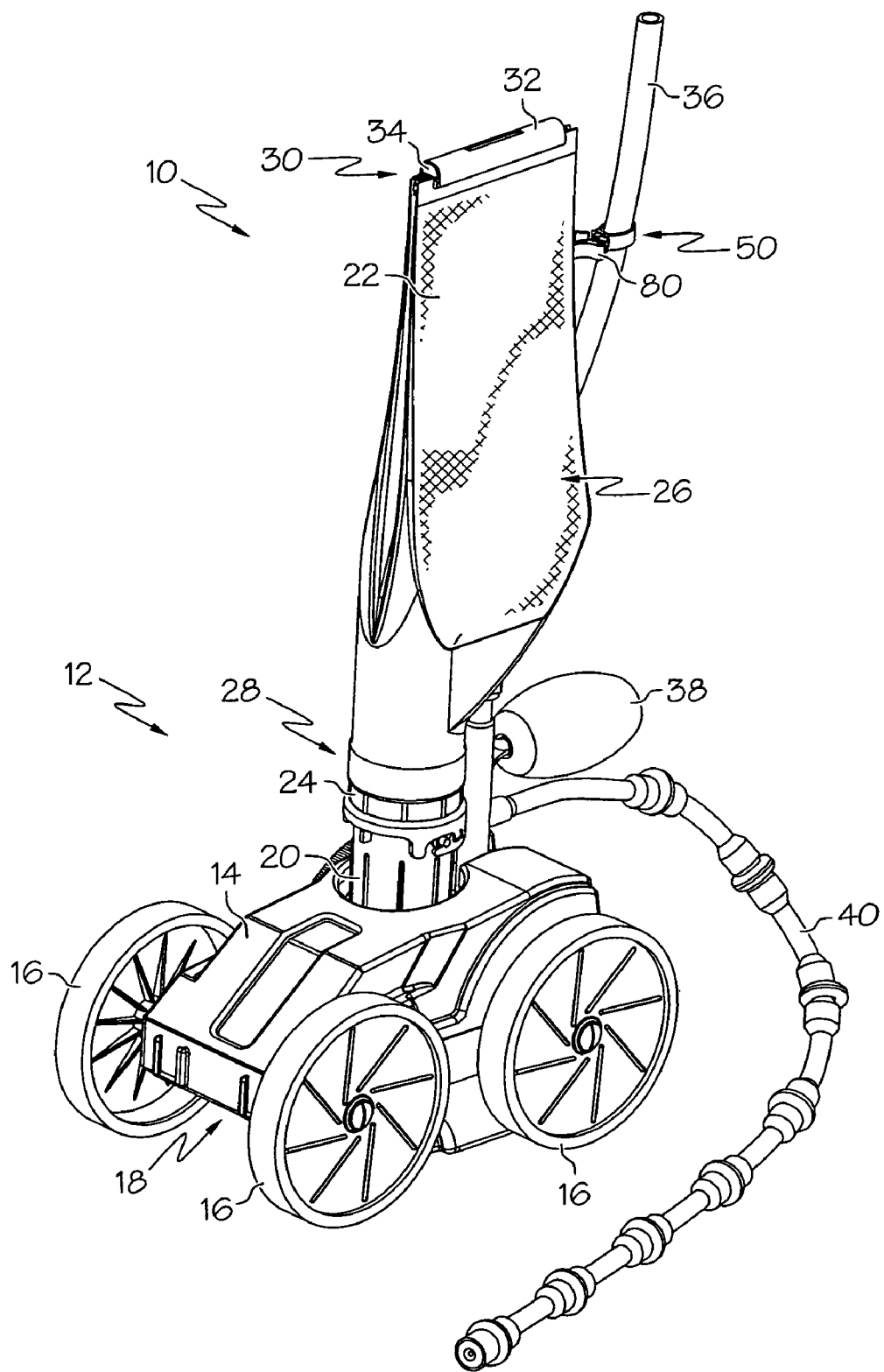
FIG. 1 is a perspective view of an example automatic pool cleaner with an example hose clip.

An example embodiment of a device that incorporates aspects of the present invention is shown in the drawings. It is to be appreciated that the shown example is not intended to be a limitation on the present invention. For example, one or more aspects of the present invention can be utilized in other embodiments and even other types of devices.

Turning to the shown example of FIG. 1, an example arrangement 10 for cleaning a swimming pool (not shown) includes an example automatic pool cleaner 12 adapted to collect debris (not shown) from the swimming pool. The automatic pool cleaner 12 can include various elements, such as a main body portion 14 supported by a plurality of wheels 16 for movement along a surface of the pool. In addition, the pool cleaner 12 can include a suction inlet 18, adapted to collect debris, in fluid communication with a suction outlet 20.

In addition, the arrangement 10 can include a debris bag 22 having a first end 28 and a second end 30. The first end 28 can include an example coupling 24 adapted to attach to the suction outlet 20 of the pool cleaner for receiving debris from the pool ejected by the pool cleaner into the debris bag 22. The second end 30 can include a closable end having a securing apparatus 32 that can be adapted to selectively retain the second end 30 in a closed position. For example, the securing apparatus 32 can include a plurality of separable members forming a clasp retained by various connections, such as a snap fit connection, a magnetic connection, a latched connection, a resiliently-biased clamping connection, or a buckled connection. Further still, the separable portions of the securing apparatus 32 can be permanently connected to each other, such as, for example, by a strap, such that they form one continuous component having portions adapted to separate from each other.

As shown, the first end 28 is disposed towards the bottom of the debris bag 22 and the second end 30 is disposed towards the top of the debris bag 22, though it is to be appreciated that either end 28, 30 can also be disposed along either, or both, of the left and/or right sides. Additionally, the debris bag 22 can include additional components. For example, the debris bag 22 can include a porous material 26 that is configured to easily allow the passage of water or other liquids therethrough while inhibiting the passage of most debris collected by pool cleaners. In another example, the debris bag 22 can include a float 34 disposed near the top of the debris bag 22 to ensure that the debris bag 22 remains substantially upright during submerged travel in the pool. As shown, the float 34 can be attached to the securing apparatus 32. The float 34 can include any suitably buoyant configuration that has a buoyancy sufficient to at least partially support the debris bag 22 during operation of the automatic pool cleaner.

In addition, the automatic pool cleaner 12 can be a pressure-side pool cleaner type adapted to receive a pressurized fluid, such as water, from an external pump (not shown). Accordingly, the arrangement 10 can include a hose 36 adapted to provide the pressurized water from a pump to the pool cleaner 12. For example, the hose 36 can extend from a pump located outside of the pool to a connection point on the main body portion 14 of the pool cleaner 12. The hose 36 can include various materials and can have various other geometries, such as a generally circular cross section. In addition, the hose 36 can be of various sizes, such as various outer and inner diameters. For example, various automatic pool cleaners 12 having various performance characteristics can use various size pool hoses 36 to supply various amounts and/or pressures of water to the pool cleaners 12.

The pool cleaner 12 can include various other components. For example, the pool cleaner 12 can include a balance float 38 adapted to help maintain the balance of the pool cleaner 12 as it travels through the pool. Further still, the pool cleaner 12 can include a sweep hose 40 adapted to loosen debris from the pool floor, such as by moving in a whipping motion. It is to be appreciated that the foregoing descriptions of the various components of the arrangement 10, such as the pool cleaner 12, debris bag 22, and pool hose 36, are not intended to provide a limitation upon the present invention, and that various other and/or additional elements can also be used therewith.

An adjustable hose clip 50 can be used with the pool cleaner debris bag 22. In addition or alternatively, the arrangement 10 can also include the adjustable hose clip 50.

The hose clip 50 can help to inhibit movement of the hose 36 relative to the debris bag 22, and it can also help to hold and stabilize the debris bag 22, as will be described more fully herein. The hose clip 50 can include various materials, including various substantially rigid materials, such as plastic, metal, or the like. However, the hose clip 50 can also include flexible materials, such as flexible plastics, rubbers, or the like.

Figure 2:
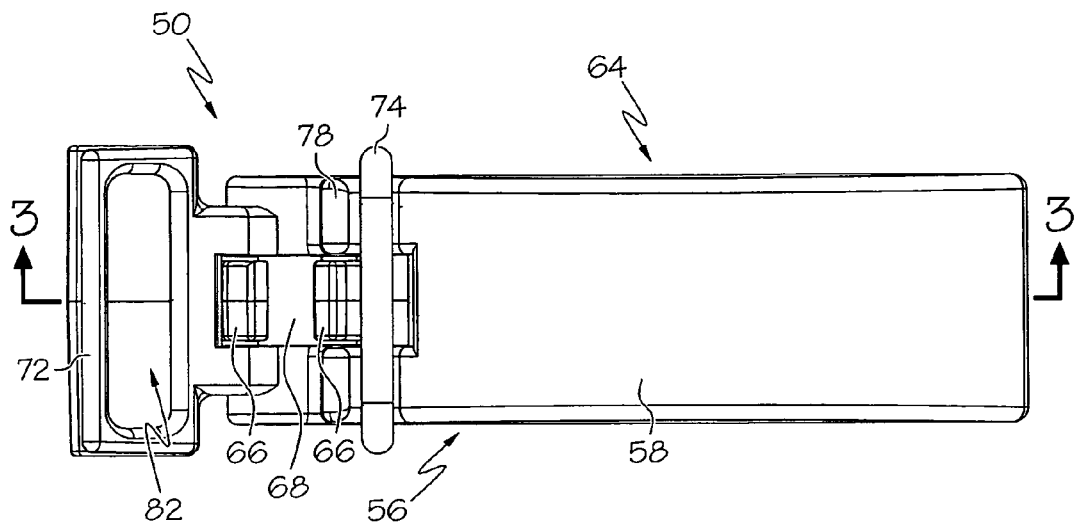
FIG. 2 is a side view of the hose clip of FIG. 1.
Figure 3:
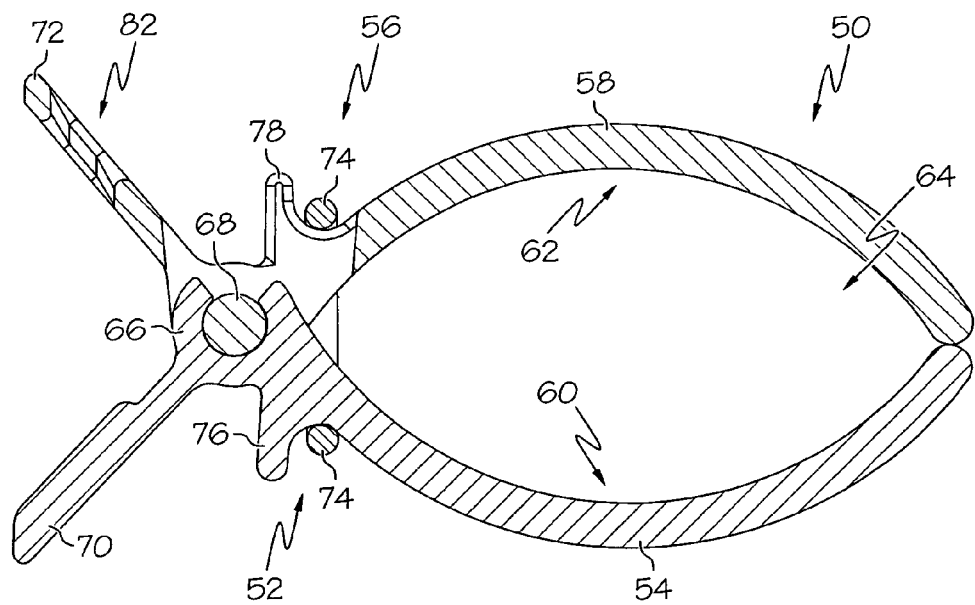
FIG. 3 is a sectional view of the hose clip along line 3-3 of FIG. 2.

Turning now to the examples shown in FIGS. 2-3, the adjustable hose clip 50 can include a first member 52 having a retaining arm 54, and a second member 56 having a retaining arm 58. Either, or both, of the retaining arms 54, 58 can include an arcuate portion 60, 62. For example, as shown, the arcuate portions 60, 62 can curve away from each other to form an open area 64 therebetween. Either, or both, of the arcuate portions 60, 62 can also have various other curved geometries adapted to retain various pool hoses 36 therebetween, as will be discussed more fully herein.

The retaining arms 54, 58 can be adapted to be selectively spaced a distance from each other. Thus, the arcuate portions 60, 62 can be selectively spaced a distance from each other to increase or decrease the open area 64 therebetween. Accordingly, as shown in FIG. 3, the first member 52 can be pivotally attached to the second member 56 such that the retaining arms 54, 58 can be adapted to pivot relative to each other. For example, one of the members 52, 56, such as the first member 52, can include female hinge structure 66, and the other member, such as the second member 56, can include corresponding male hinge structure 68. The hinge structures 66, 68 can be formed with the first and second members 52, 56, or can be attached thereto using various methods, such as fasteners, adhesives, welding, or the like. Thus, to assemble the hose clip 50, such as when the hinge structures 66, 68 are formed with the members 52, 56, the male hinge structure 68 can be inserted into the female hinge structure 66 using a snap fit connection, or the like. In addition or alternatively, the male hinge structure 68 can comprise a separate element, such as a pin or the like, that can be selectively inserted into the female hinge structure 66 (e.g., though a sliding insertion or the like). Thus, the hinge structure 66, 68 can also permit the hose clip 50 can be assembled and disassembled for cleaning and/or part replacement. It is to be appreciated that the first and second members 52, 56 can also include various other elements adapted to provide a pivotable connection.

In addition, either or both of the first and second members 52, 56 can include a handle 70, 72. As shown, the handles 70, 72 can be disposed towards the ends of the first and second members 52, 56. The handles 70, 72 can be adapted to be actuated by the hand of a user, such as by a user's fingers. Additionally, as shown, the handles 70, 72 can be disposed on one side of the pivotable connection, while the retaining arms 54, 58 can be disposed on the other side of the pivotable connection. Thus, the arcuate portions 60, 62 of the retaining arms 54, 58 can be adapted to be selectively spaced a distance from each other (e.g., the space of the open area 64 can be selectively adjusted) when the handle 70 of the first member 52 is moved towards the handle 72 of the second member 56. For example, a user can actuate the handles 70, 72 by squeezing them together, though it is to be appreciated that the hose clip 50 can include various other methods of selectively spacing the retaining arms 54, 58 a distance from each other.

Keeping with the examples shown in FIGS. 2-3, the adjustable hose clip 50 can also include resilient means 74 for resiliently biasing the retaining arms 54, 58 towards each other such that at least a portion of the pool hose 36 can be retained between the retaining arms 54, 58. In addition or alternatively, the arrangement 10 can also include the resilient means 74. In one example, the resilient means 74 can comprise a resilient member that includes an elastomeric material, or the like, though the resilient means 74 and/or member can also include various other resilient materials. Further, as shown, the resilient means 74 can comprise a resilient ring adapted to wrap around portions of the first and second members 52, 56. Thus, as shown, the first and second members 52, 56 can each include a lip 76, 78 adapted to retain the resilient member 74. The resilient means 74 can include a substantially circular cross-sectional geometry, as shown in FIG. 3, to permit it to move relatively easily with respect to the lips 76, 78 when the retaining arms 54, 58 are selectively moved various distances from each other. In addition, as shown, the lips 76, 78 can also include corresponding curved geometry to facilitate movement of the resilient means 74.

It is to be appreciated that the resilient means 74 and/or resilient member can be disposed at other locations on the first and second members 52, 56 and can include various other shapes and cross-sectional geometries, such as triangular, elliptical, square, rectangular, trapezoidal, frusto-conical, or the like. In addition or alternatively, the resilient means 74 and/or resilient member can comprise various other resilient devices, such as various types of springs (e.g., a coil spring, helical spring, flat spring, toggle spring, or the like, not shown) disposed at various locations, such as between the first and second members 54, 58. For example, a spring or the like can be cooperate with and/or be integrated into the pivotable connection. In another example, a spring can cooperate with and/or be integrated into either, or both, of the handles 70, 72.

Figure 4A:
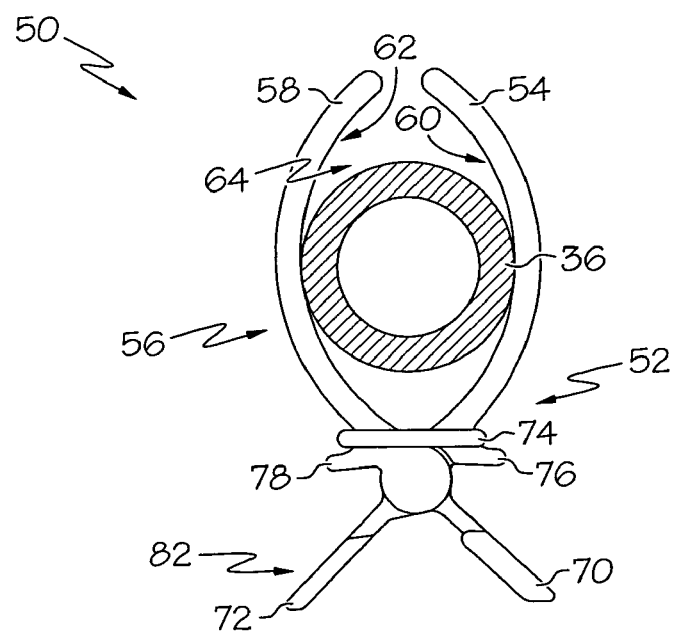
FIG. 4A is a top view of the hose clip retaining an example pool hose having a first diameter.
Figure 4B:
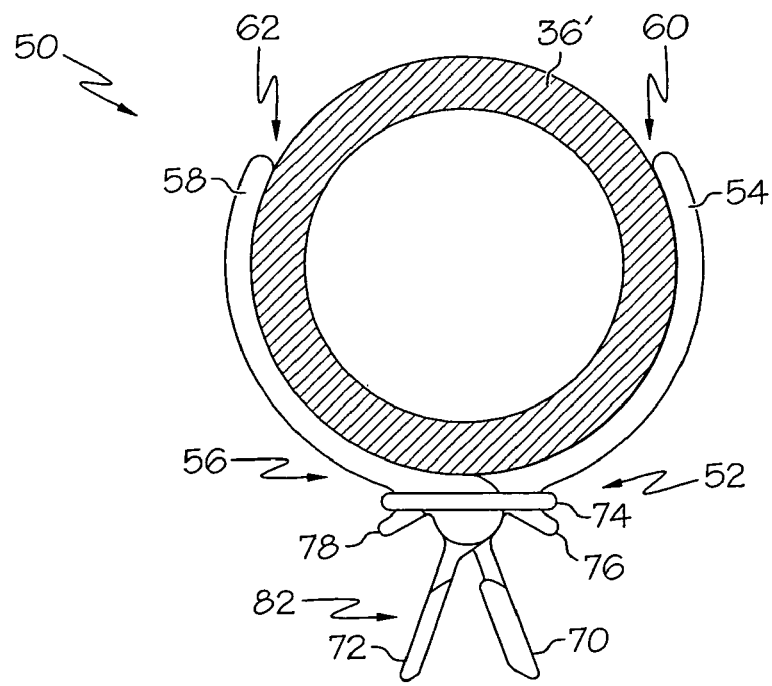
FIG. 4B similar to FIG. 4A, but shows the hose clip retaining an example pool hose having a second diameter.

Turning now to the examples shown in FIGS. 4A-4B, the resilient means 74 can be adapted to automatically adjust the distance between the retaining arms 54, 58 to accommodate various pool hoses 36 having various sizes, such as various diameters. In one example, the resilient means 74 can be adapted to automatically adjust the distance between the retaining arms 54, 58 to accommodate various pool hoses 36 having various diameters within the range of a minimum diameter to a maximum diameter at least 50% larger than the minimum diameter. Thus, for example, if the minimum diameter is 0.75 inches (¾"), the resilient means 74 can be adapted to automatically adjust the hose clip 50 to accommodate a pool hose 36 having a maximum diameter of at least 1.125 inches (1 and ⅛"). In another example, the resilient means 74 can be adapted to automatically adjust the hose clip 50 to accommodate another pool hose 36' (e.g., similar to the original pool hose 36, though having a larger diameter) within the range of a minimum diameter to a maximum diameter at least 100% larger than the minimum diameter. Thus, for example, if the minimum diameter is 0.75 inches (¾"), the resilient means 74 can be adapted to adjust the hose clip 50 to accommodate a pool hose 36' having a maximum diameter of at least 1.50 inches (1 and ½"). It is to be appreciated that the foregoing examples and dimensions are not intended to provide a limitation upon the present invention, and that the resilient means 74 can be adapted to automatically adjust the hose clip 50 to accommodate various pool hoses having various diameters.

As previously stated, the resilient means 74 can be adapted to automatically adjust the distance between the retaining arms 54, 58. Thus, as shown in FIG. 4B, a user can apply a force greater than the biasing force of the resilient means 74 to move the handle 70 of the first member 52 towards the handle 72 of the second member 56 to increase the size of the open area 64 between the retaining arms 54, 58. Simultaneously, the resilient ring 74 is stretched and stores energy, though its range of motion can be limited by the lips 76, 78. Accordingly, when the handles 70, 72 are subsequently released, the energy stored in the resilient ring 74 can be released. Thus, the resilient biasing force can automatically move the retaining arms 54, 58 towards each other to cause the size of the open area 64 to decrease to approximately the diameter of the particular pool hose 36 located between the retaining arms 54, 58 to thereby retain the pool hose 36.

Returning briefly to the example shown in FIG. 1, the adjustable hose clip 50 can also include means 80 for connecting the hose clip 50 to a pool cleaner debris bag 22. In addition or alternatively, the arrangement 10 can also include the means 80 for connecting. In one example, the means 80 for connecting can comprise a connecting member adapted to tether the hose clip 50 to the debris bag 22. In another example, the means 80 for connecting can include a strap. The means 80 for connecting can include various materials, such as a flexible material and/or a resilient material, though it can also include a substantially rigid material. In another example, the means 80 for connecting can include a fabric material, such as the porous material 26 of the debris bag 22. It is to be appreciated that the means 80 for connecting and/or connecting member can include various other elements adapted to connect the hose clip 50 to the debris bag 22.

Figure 5:
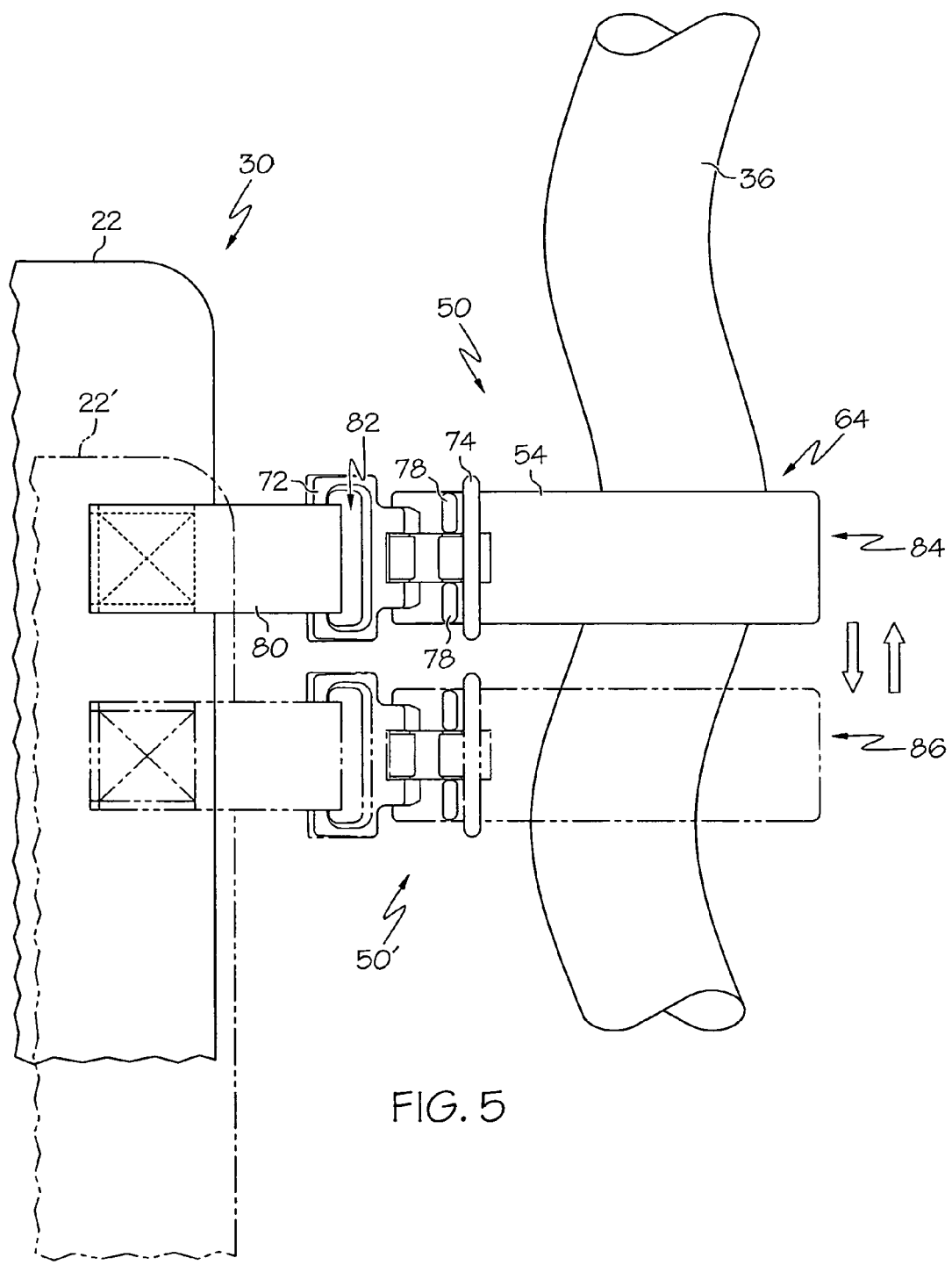
FIG. 5 is a side view of the hose clip retaining an example pool hose in various positions.

The means 80 for connecting can be attached to the hose clip 50 and the debris bag 22 in various ways. For example, at least one of the handles 70, 72 of the first and second members 52, 56 can be adapted to attach to the means 80 for connecting. As shown in FIGS. 2, 3 and 5, the handle 72 of the second member 56 can include a hole 82 extending therethrough to attach the strap 80 to the hose clip 50, though the strap 80 can also attach to the hose clip 50 in various other ways. In addition or alternatively, the means 80 for connecting, such as a flexible strap, can be attached to the debris bag 22 in various ways. For example, the flexible strap 80 can be attached to the debris bag 22 by using fasteners, adhesives, welding, or sewn stitching (see FIG. 5), or it can even be formed with the debris bag 22.

Thus, because the hose clip 50 can retain a portion of the pool hose 36, and the means 80 for connecting can be attached between the hose clip 50 and the debris bag 22, the hose clip 50 can provide support for the debris bag 22 during operation of the automatic pool cleaner 12. For example, the means 80 for connecting can be adapted to maintain one portion of the debris bag 22 above another portion of the debris bag 22 when the pool hose 36 is being retained by the retaining arms 54, 58. In another example, the means 80 for connecting can be adapted to maintain the second end 30 of the debris bag 22 above the first end 28 of the debris bag 22 when the pool hose 36 is being retained by the retaining arms 54, 58. Accordingly, the hose clip 50 and means 80 for connecting can provide support for the debris bag 22 to maintain it in a substantially upright position during operation of the pool cleaner 12 to inhibit the debris bag 22 from toppling over and possibly decreasing the interior volume of the debris bag 22. It is to be appreciated that because the first and second ends 28, 30 of the debris bag 22 can be disposed at various locations and orientations, the hose clip 50 and means 80 for connecting can also support the debris bag 22 in various other manners other than those described herein.

Turning now to the example shown in FIG. 5, the resilient means 74 can be adapted to provide various forces. For example, the resilient means 74 can resiliently bias the retaining arms 54, 58 towards each other with a sufficient force to retain at least a portion of a pool hose 36 between the retaining arms 54, 58 while also permitting slight sliding movement of the pool hose 36 relative to the retaining arms 54, 58. As previously described, the hose clip 50 and means 80 for connecting can provide support for the debris bag 22 to maintain it in a substantially upright position during operation of the pool cleaner 12 to thereby inhibit the debris bag 22 from toppling over. However, as the debris bag 22 fills with debris during operation of the pool cleaner 12, the weight, volume, and/or buoyancy of the collected debris can cause the debris bag 22 to change shape and/or orientation. In one example, the debris bag 22' (shown in phantom) can sag. Further still, the hose clip 50 can be adapted to slide relative to the pool hose 36 in response to various other forces, such as shock forces or the like, that can result if the pool cleaner 12 or pool hose 36 gets caught on structure in or around the pool area.

Thus, as shown in FIG. 5, the resilient means 74 can resiliently bias the retaining arms 54, 58 towards each other while also permitting slight sliding movement the hose clip 50 relative to the pool hose 36 to thereby inhibit relatively large amounts of stress on the pool hose 36, hose clip 50, and/or means 80 for connecting. For example, the hose clip 50 can first be attached to the pool hose 36 at a first position 84 at the beginning of the pool cleaning process. As the debris bag 22' (shown in phantom) fills with collected debris and changes shape, orientation, and/or buoyancy, the hose clip 50' (shown in phantom) can be permitted to slide downward, relative to the pool hose 36, towards a second position 86. In addition or alternatively, the hose clip 50 can also be adapted to slide slightly upwards in response to various other forces, such as the buoyant force of the float 34 disposed near the top of the debris bag 22. Thus, the resilient means 74 can provide enough resilient force to retain a portion of the pool hose 36 therebetween while also permitting slight sliding movement of the hose clip 50 (e.g., upwards or downwards) relative to the pool hose 36 in response to changes in shape, orientation, and/or buoyancy of the debris bag 22. It is to be appreciated that the first and second positions 84, 86 described herein are not intended to provide a limitation upon the present invention, and that the hose clip 50 can be adapted to slide to various positions relative to the pool hose 36.

An example operation of the arrangement 10 and the adjustable hose clip 50 will now be explained. First, the debris bag 22 and pool hose 36 can be attached to an automatic pool, such as shown in the example of FIG. 1. Next, the hose clip 50 can be connected to the debris bag 22, if not already connected. Next, a user can actuate the handles 70, 72 of the hose clip 50 by applying a force greater than the resilient biasing force of the resilient means 74 (e.g., by squeezing them together) to selectively space the arcuate portions 60, 62 of the retaining arms 54, 58 a distance from each other. The space of the open area 64 can be selectively adjusted until it is substantially equal to or larger than the diameter of the pool hose 36. The pool hose 36 can then be inserted into the open area 64. Next, the user can release the handles 70, 72, and the resilient biasing force of the resilient means 74 can resiliently bias the retaining arms 54, 58 towards each other until a portion of the pool hose 36 is retained therebetween. In addition, the resilient means 74 can provide enough resilient force to retain a portion of the pool hose 36 while also permitting slight sliding movement of the hose clip 50 (e.g., upwards or downwards) relative to the pool hose 36 in response to changes in shape, orientation, and/or buoyancy of the debris bag 22. It is to be appreciated that more or less steps can be used with operation of the adjustable hose clip 50.

The invention has been described with reference to various example embodiments. Obviously, modifications and alterations will occur to others upon a reading and understanding of this specification. It is intended to include all such modifications and alterations insofar as they come within the scope of the appended claims or the equivalents thereof.

What is claimed is:

1. An arrangement for cleaning a swimming pool, comprising:
    an automatic pool cleaner adapted to collect debris from the pool;
    a debris bag having a first end and a second end, wherein the first end is adapted to attach to the automatic pool cleaner;
    a hose adapted to provide pressurized water to the automatic pool cleaner; and
    an adjustable hose clip comprising at least two retaining arms adapted to be selectively spaced a distance from each other, means for connecting the hose clip to the debris bag, and resilient means for resiliently biasing the retaining arms towards each other such that at least a portion of the hose can be retained between the retaining arms, wherein the resilient means is adapted to automatically adjust the distance between the retaining arms to accommodate various hoses having various diameters within the range of a minimum diameter to a maximum diameter at least 50% larger than the minimum diameter, and wherein the means for connecting is further adapted to maintain the second end of the debris bag above the first end when the pool hose is being retained by the retaining arms.

2. The arrangement for cleaning a swimming pool of claim 1, wherein the means for connecting the hose clip to the debris bag includes a flexible strap having a portion that is attached to the debris bag.

3. The arrangement for cleaning a swimming pool of claim 1, wherein the resilient means includes a resilient ring.

4. The arrangement for cleaning a swimming pool of claim 1, wherein the resilient means resiliently biases the retaining arms towards each other with a sufficient force to retain at least a portion of the hose between the retaining arms while also permitting slight sliding movement of the adjustable hose clip relative to the hose.

5. The arrangement for cleaning a swimming pool of claim 1, wherein the maximum diameter is at least 100% larger than the minimum diameter.

* * * * *